United States Patent
Saito

(10) Patent No.: US 6,667,662 B2
(45) Date of Patent: Dec. 23, 2003

(54) OSCILLATOR CIRCUIT OF INTERNAL POWER GENERATOR CIRCUIT AND CONTROL METHOD THEREOF

(75) Inventor: Syuichi Saito, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/076,586

(22) Filed: Feb. 19, 2002

(65) Prior Publication Data

US 2002/0145480 A1 Oct. 10, 2002

(30) Foreign Application Priority Data

Apr. 6, 2001 (JP) ........................................ 2001-108748

(51) Int. Cl.$^7$ ................................................ H03L 7/00
(52) U.S. Cl. ........................ 331/1 A; 327/534; 327/535; 327/536
(58) Field of Search ................................. 327/147, 148, 327/156, 157, 534, 535, 536, 537; 375/376; 331/2, 7, 57, 58, 25, 1 A

(56) References Cited

U.S. PATENT DOCUMENTS 6,317,006 B1 * 11/2001 Welland et al. ................ 331/25
6,501,300 B2 * 12/2002 Hatae .......................... 326/93

\* cited by examiner

Primary Examiner—Tuan T. Lam
Assistant Examiner—Hiep Nguyen
(74) Attorney, Agent, or Firm—Arent Fox Kintner Plotkin & Kahn, PLLC

(57) ABSTRACT

An oscillator circuit which generates an oscillator signal that ensures the generation of a stable internal supply voltage. The oscillator circuit has a periodic circuit which includes a switch circuit. A method of controlling the oscillator circuit includes the steps of operating the periodic circuit using the switch circuit in response to a first control signal when the first control signal is in a first state to generate a first oscillator signal having a first frequency, and operating the periodic circuit using the switch circuit in response to a second control signal when the first control signal is in a second state to generate a second oscillator signal having a period synchronized to a period of the second control signal having a second frequency.

24 Claims, 10 Drawing Sheets

OSCILLATOR CIRCUIT OF INTERNAL POWER GENERATOR CIRCUIT AND CONTROL METHOD THEREOF

BACKGROUND OF THE INVENTION

The present invention relates to an oscillator circuit, and more particularly, to an oscillator circuit that generates an oscillator signal supplied to a charge pump circuit of an internal power generator circuit.

FIG. 1 is a schematic block diagram of a conventional internal power generator circuit built in a semiconductor device. The internal power generator circuit acts as a boosted power generator circuit 91 for boosting an external or internal supply voltage VDD to generate a boosted voltage VPP.

The boosted power generator circuit 91 includes a first and a second detector circuit 92, 93 for detecting the boosted voltage VPP; a first and a second oscillator circuit 94, 95; a signal synthesizer circuit 96; and a charge pump circuit 97. The boosted power generator circuit 91 has an active mode in which a current is supplied with a relatively large driving performance, and a standby mode in which a current is supplied with a relatively small driving performance.

The active mode will be first described.

In the active mode, the first detector circuit 92 is activated by an activation signal φ. The first detector 92 is a detector circuit for the active mode which has relatively large current consumption and operates at a relatively high reaction speed. The first detector circuit 92 detects the boosted voltage VPP in the active mode and generates a detection signal DET-A when the boosted voltage VPP decreases to a voltage equal to or smaller than a predetermined voltage. The first oscillator circuit 94 receives the detection signal DET-A from the first detector circuit 92, and generates an oscillator signal OSC-A for the active mode which has a relatively short period (for example, several tens of nanoseconds (ns)) (i.e., a relatively high oscillating frequency).

The signal synthesizer circuit 96 receives the oscillator signal OSC-A from the first oscillator circuit 94, and generates an oscillator signal OSC in accordance with the oscillator signal OSC-A for the active mode. The charge pump circuit 97 performs a charge pump operation following the period of the oscillator signal OSC to boost the external or internal supply voltage VDD to generate the boosted voltage VPP.

Next, the standby mode will be described.

The second detector circuit 93 is activated without fail whenever the device is applied with the supply voltage VDD, not only in the standby mode. The second detector circuit 93 is a detector circuit for the standby mode which has relatively small current consumption and operates at a relatively low reaction speed. The second detector circuit 93 is activated at all times irrespective of whether the device is in the active mode or in the standby mode.

The second detector circuit 93 detects the boosted voltage VPP, and generates a detection signal DET-S when the boosted voltage VPP decreases to a voltage equal to or smaller than a predetermined voltage. The second oscillator circuit 95 receives the detection signal DET-S from the second detector circuit 93, and generates an oscillator signal OSC-S for the standby mode which has a relatively long period (for example, several hundreds of nanoseconds (ns)) (i.e., a relatively low oscillating frequency).

The signal synthesizer circuit 96 receives the oscillator signal OSC-S for the standby mode from the second oscillator circuit 95, and generates an oscillator signal OSC in accordance with the oscillator signal OSC-S for the standby mode. The charge pump circuit 97 performs a charge pump operation following the period of the oscillator signal OSC to boost the external or internal supply voltage VDD to generate the boosted voltage VPP.

As described above, the boosted power generator circuit 91 operates at different frequencies in the active mode and standby mode. In the active mode, the boosted power generator circuit 91 supplies a larger current than in the standby mode to generate the boosted voltage VPP. In the standby mode, the boosted power generator circuit 91 consumes a smaller current to limit its power consumption.

In the active mode, the first oscillator circuit 94 as well as the second oscillator circuit 95 are activated. However, since the first and second oscillator circuits 94, 95 are asynchronous to each other, a pulse having a shorter period than the period of the oscillator signals OSC-A, OSC-S of the oscillator circuits 94, 95 may be generated in some cases. Such a pulse may cause a malfunction of the charge pump circuit 97. Specifically, a shorter pulse period would result in a failure in a sufficient charge pump operation, a reduced current supply capability, or increased power consumption.

To solve this problem, it is contemplated to separately provide a charge pump circuit for the active mode and a charge pump circuit for the standby mode. However, since the charge pump circuit has a relatively large circuit area, separately provided charge pump circuits would result in an increased semiconductor die size and increased power consumption.

SUMMARY OF THE INVENTION

It is an object of the present invention to provide an oscillator circuit which generates an oscillator signal that ensures the generation of a stable internal supply voltage.

In a first aspect of the present invention, a method of controlling an oscillator circuit having a periodic circuit which includes a switch circuit is provided. The method includes the steps of operating the periodic circuit using the switch circuit in response to a first control signal when the first control signal is in a first state to generate a first oscillator signal having a first frequency, and operating the periodic circuit using the switch circuit in response to a second control signal when the first control signal is in a second state to generate a second oscillator signal having a period synchronized to a period of the second control signal having a second frequency.

In a second aspect of the present invention, a method of controlling an oscillator circuit having a periodic circuit which includes a switch circuit is provided. The method includes the steps of operating the periodic circuit in response to a first control signal using the switch circuit to generate a first oscillator signal synchronized in phase to the first control signal, and operating the periodic circuit in response to a second control signal using the switch circuit to generate a second oscillator signal synchronized in phase to the second control signal.

In a third aspect of the present invention, an oscillator circuit is provided that includes a synthesizer for synthesizing a first control signal with a pulse signal to generate a synthesized signal, a pulse generator circuit connected to the synthesizer for generating a pulse signal in response to a second control signal and supplying the pulse signal to the synthesizer, a control circuit connected to the synthesizer for generating a switch control signal in accordance with the synthesized signal, and a periodic circuit connected to the control circuit, and including a switch circuit responsive to the switch control signal. The periodic circuit generates one of a first oscillator signal having a first frequency and a second oscillator signal having a second frequency in accordance with an operation of the switch circuit.

In a fourth aspect of the present invention, an oscillator circuit is provided that includes a first pulse generator circuit for generating a first pulse signal in response to a first control signal, a second pulse generator circuit for generating a second pulse signal in response to a second control signal, a synthesizer connected to the first and second pulse generator circuits for synthesizing the first pulse signal and the second pulse signal to generate a synthesized signal, a control circuit connected to the synthesizer for generating a switch control signal in accordance with the synthesized signal, and a periodic circuit connected to the control circuit, and including a switch circuit responsive to the switch control signal. The periodic circuit generates one of a first oscillator signal corresponding to the first control signal and having a first frequency and a second oscillator signal corresponding to the second control signal and having a second frequency in accordance with an operation of the switch circuit.

In a fifth aspect of the present invention, a method of controlling an internal power generator circuit is provided. The internal power generator circuit includes an oscillator circuit having a periodic circuit including a switch circuit, and a charge pump circuit connected to the oscillator circuit. The method includes the steps of operating the periodic circuit in response to a first control signal using the switch circuit, when the first control signal is in a first state, to generate a first oscillator signal having a first frequency, generating a voltage in accordance with the first oscillator signal using the charge pump circuit, operating the periodic circuit in response to a second control signal using the switch circuit, when the first control signal is in a second state, to generate a second oscillator signal having a period synchronized to a period of the second control signal having a second frequency, and generating the voltage in accordance with the second oscillator signal using the charge pump circuit.

In a sixth aspect of the present invention, a method of controlling an internal power generator circuit is provided. The internal power generator circuit includes an oscillator circuit including a periodic circuit having a switch circuit, and a switch control circuit for controlling the switch circuit, and a charge pump circuit connected to the oscillator circuit. The method includes the steps of controlling the switch circuit in response to a first control signal by the switch control circuit to operate the periodic circuit to generate a first oscillator signal having a period synchronized to a period of the first control signal, generating a voltage in accordance with the first oscillator signal using the charge pump circuit, controlling the switch circuit in response to a second control signal by the switch control circuit to operate the periodic circuit to generate a second oscillator signal having a period synchronized to a period of the second control signal, and generating the voltage in accordance with the second oscillator signal using the charge pump circuit.

In a seventh aspect of the present invention, an internal power generator circuit is provided that includes a first oscillator circuit and a charge pump circuit. The first oscillator circuit includes a synthesizer for synthesizing a first control signal with a pulse signal to generate a synthesized signal, a pulse generator circuit connected to the synthesizer for generating a pulse signal in response to a second control signal and supplying the synthesizer with the pulse signal, a control circuit connected to the synthesizer for generating a switch control signal in accordance with the synthesized signal, and a periodic circuit connected to the control circuit and including a switch circuit responsive to the switch control signal. The periodic circuit generates one of a first oscillator signal having a first frequency and a second oscillator signal having a second frequency in accordance with an operation of the switch circuit. The charge pump circuit is connected to the periodic circuit and generates a voltage in accordance with one of the first oscillator signal and the second oscillator signal.

In an eighth aspect of the present invention, an internal power generator circuit is provided that includes a first oscillator circuit and a charge pump circuit. The first oscillator circuit includes a first pulse generator circuit for generating a first pulse signal in response to a first control signal, a second pulse generator circuit for generating a second pulse signal in response to a second control signal, a synthesizer connected to the first and second pulse generator circuits for synthesizing the first pulse signal and the second pulse signal to generate a synthesized signal, a control circuit connected to the synthesizer for generating a switch control signal in accordance with the synthesized signal, and a periodic circuit connected to the control circuit, and including a switch circuit responsive to the switch control signal. The periodic circuit generates one of a first oscillator signal corresponding to the first control signal and having a first frequency and a second oscillator signal corresponding to the second control signal and having a second frequency in accordance with an operation of the switch circuit. The charge pump circuit is connected to the periodic circuit and generates a voltage in accordance with one of the first oscillator signal and the second oscillator signal.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
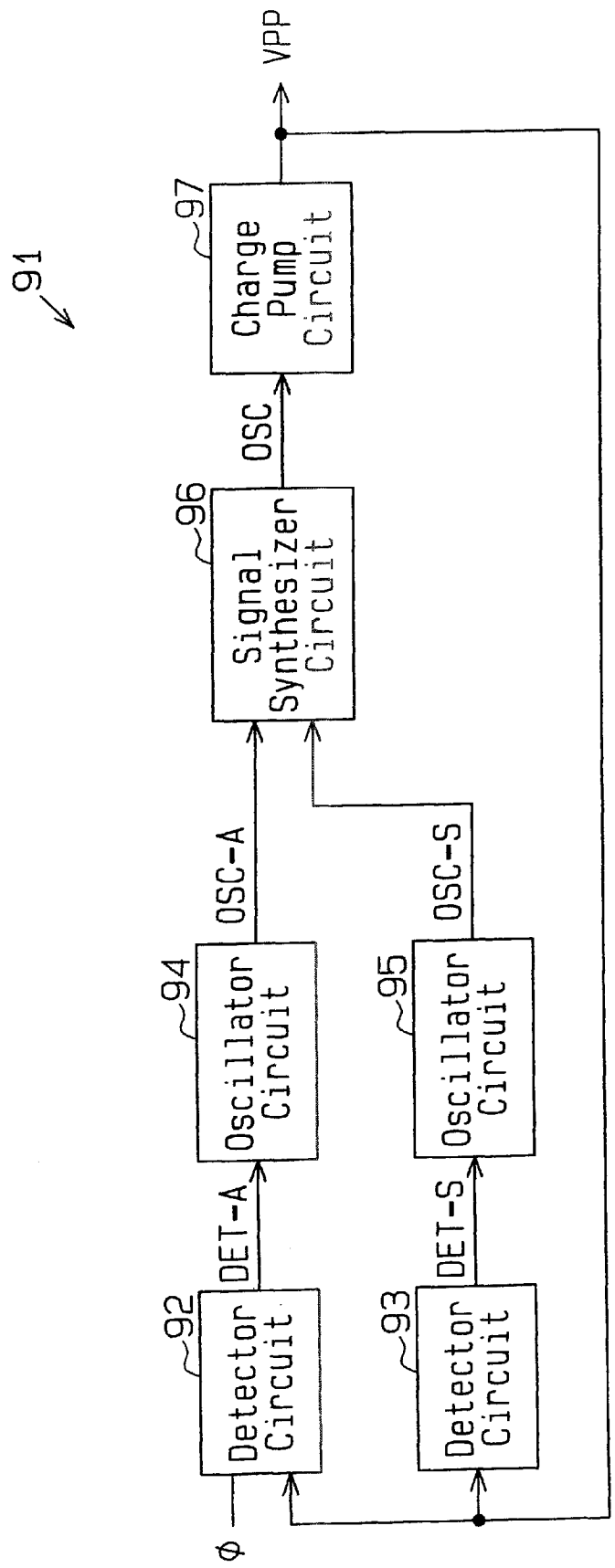
FIG. 1 is a schematic block diagram of a conventional boosted power generator circuit.

In the drawings, like numerals are used for like elements throughout.

Figure 2:
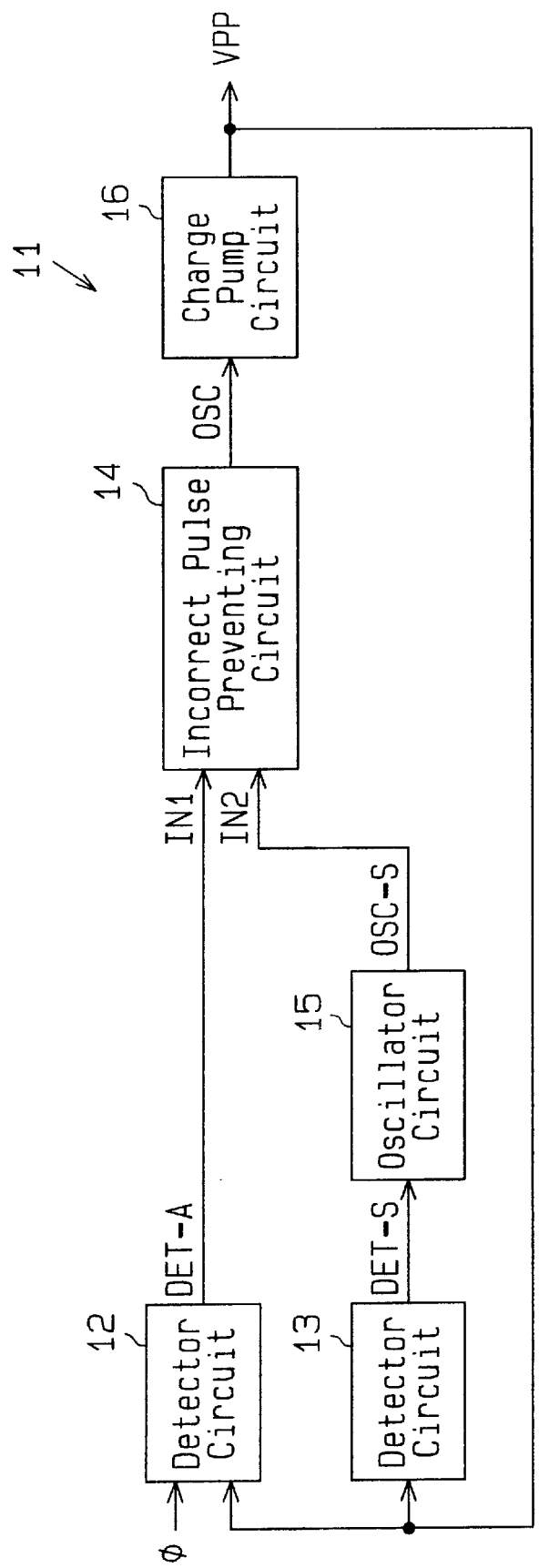
FIG. 2 is a schematic block diagram of a boosted power generator circuit according to a first embodiment of the present invention.

A boosted power generator circuit 11 according to a first embodiment of the present invention will be described with reference to FIGS. 2 through 10. As illustrated in FIG. 2, the boosted power generator circuit 11 includes first and second detector circuits 12, 13 for detecting a boosted voltage VPP; an incorrect pulse preventing circuit 14; an oscillator circuit 15; and a charge pump circuit 16.

The boosted power generator circuit 11 operates at different frequencies in an active mode (device operative mode) and a standby mode (device inoperative mode). The charge pump circuit 16 of the boosted power generator circuit 11 operates at a first frequency in the active mode to generate the boosted voltage VPP. The charge pump circuit 16 operates at a second frequency in the standby mode to output the boosted voltage VPP. The first frequency is greater than the second frequency, so that the boosted power generator circuit 11 supplies more currents in the active mode than in the standby mode.

The first detector circuit 12 is activated by an activation signal φ in the active mode. The first detector circuit 12 is a detector circuit for the active mode which has relatively large current consumption and operates at a relatively high reaction speed. The first detector circuit 12 detects the boosted voltage VPP in the active mode, and generates a detection signal DET-A when the boosted voltage VPP decreases to a voltage equal to or smaller than a predetermined voltage.

The second detector circuit 13 operates without fail whenever the device is applied with a supply voltage VDD, not only in the standby mode. The second detector circuit 13 is a detector circuit for the standby mode which has relatively small current consumption and operates at a relatively low reaction speed. The second detector circuit 13 detects the boosted voltage VPP, and generates a detection signal DET-S when the boosted voltage VPP decreases to a voltage equal to or smaller than a predetermined voltage.

Figure 3:
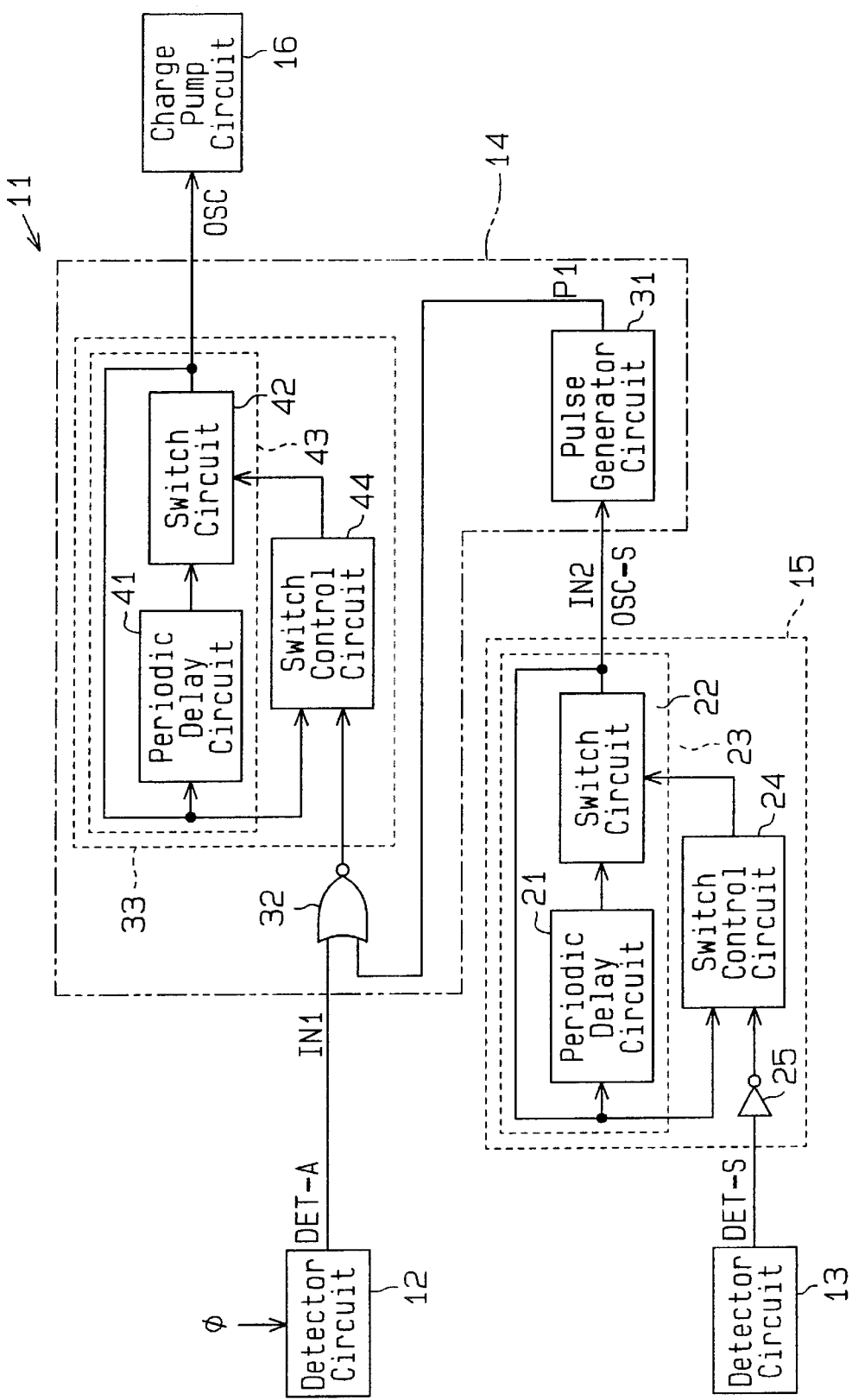
FIG. 3 is a schematic block diagram of the boosted power generator circuit of FIG. 2.

As illustrated in FIG. 3, the oscillator circuit 15 includes a periodic circuit 23; a switch control circuit 24; and an inverter gate 25. The periodic circuit 23 includes a periodic delay circuit 21 and a switch circuit 22. An output signal of the periodic delay circuit 21 is supplied to the switch circuit 22, while an output signal (oscillator signal OSC-S) of the switch circuit 22 is fed back to the periodic delay circuit 21 as well as supplied to the switch control circuit 24.

The inverter gate 25 receives the detection signal DET-S from the second detector circuit 13, inverts the detection signal DET-S, and supplies the inverted detection signal to the switch control circuit 24. The switch control circuit 24 is activated by the inverted detection signal and the oscillator signal OSC-S to supply an activation signal to the switch circuit 22. The switch circuit 22 is activated by the activation signal, so that the periodic circuit 23 operates as a ring oscillator to generate an oscillator signal OSC-S which has a second frequency.

The incorrect pulse preventing circuit 14 includes a pulse generator circuit 31; a synthesizer 32; and an oscillator circuit 33. The oscillator circuit 33 includes a periodic circuit 43 and a switch control circuit 44. The periodic circuit 43 includes a periodic delay circuit 41 and a switch circuit 42. An output signal of the periodic delay circuit 41 is supplied to the switch circuit 42, while an output signal of the switch circuit 42 (oscillator signal OSC) is fed back to the periodic delay circuit 41 as well as supplied to the switch control circuit 44.

The pulse generator circuit 31 receives the oscillator signal OSC-S from the oscillator circuit 15 and generates a pulse signal P1. The synthesizer 32 receives the pulse signal P1 and the detection signal DET-A from the first detector circuit 12, and supplies a synthesized signal to the switch control circuit 44.

The switch control circuit 44 is activated by the synthesized signal from the synthesizer 32 and the oscillator signal OSC to supply an activation signal to the switch circuit 42. The switch circuit 42 is activated by the activation signal, so that the periodic circuit 43 operates as a ring oscillator to generate the oscillator signal OSC.

The incorrect pulse preventing circuit 14 receives the detection signal DET-A (first control signal IN1) from the first detector circuit 12, and the oscillator signal OSC-S (second control signal IN2) from the oscillator circuit 15, and generates an oscillator signal OSC having a first frequency or a second frequency. The oscillator circuit 33 is activated when the synthesizer 32 is supplied with the detection signal DET-A having H-level (when the control signal IN1 is in a first state). In this event, the periodic circuit 43 of the oscillator circuit 33 oscillates at the first frequency (greater than the second frequency) to output the oscillator signal OSC having the first frequency from the periodic circuit 43.

When the synthesizer 32 is supplied with the detection signal DET-A having L-level (when the first control signal IN1 is in a second state), the oscillator circuit 33 is activated by the pulse signal P1 based on the oscillator signal OSC-S. In this event, the periodic circuit 43 of the oscillator circuit 33 oscillates at the second frequency to output the oscillator signal OSC at the second frequency from the periodic circuit 43.

The charge pump circuit 16 performs a charge pump operation in accordance with the oscillator signal OSC to generate a boosted voltage VPP which is a boosted one of the supply voltage VDD.

Figure 4:
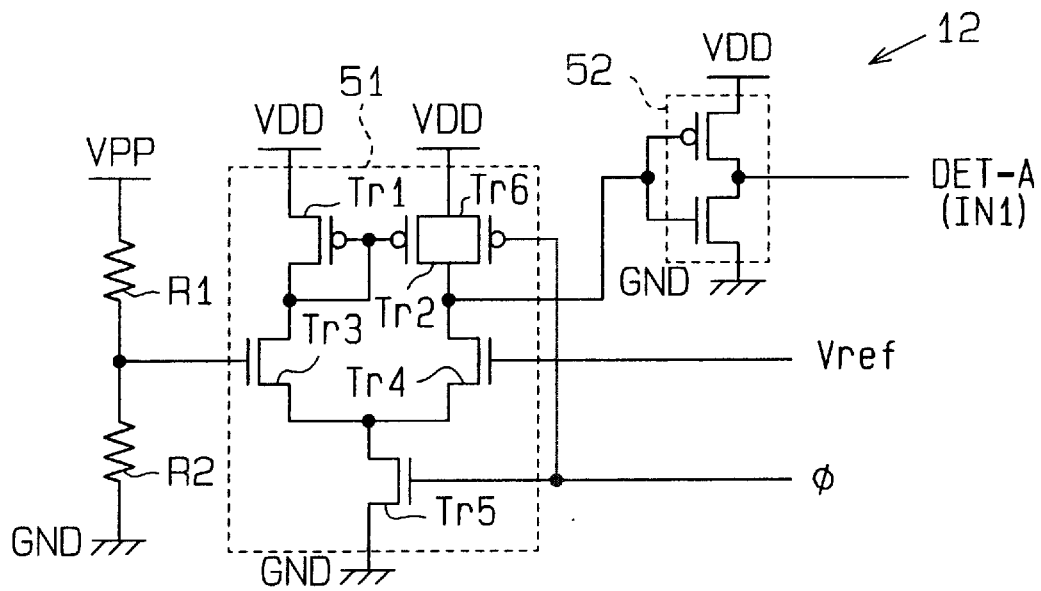
FIG. 4 is a schematic circuit diagram of a first detector circuit in the boosted power generator circuit of FIG. 2.

As illustrated in FIG. 4, the first detector circuit 12 includes resistors R1, R2; a current mirror 51; and an inverter 52. The current mirror 51 includes two PMOS transistors Tr1, Tr2; and three NMOS transistors Tr3, Tr4, Tr5.

The boosted voltage VPP generated by the charge pump circuit 16 is divided by the resistors R1, R2, and a divided voltage is supplied to a first input terminal (a gate of the first NMOS transistor Tr3) of the current mirror 51. The current mirror 51 is also supplied with a reference voltage Vref at its second input terminal (a gate of the second NMOS transistor Tr4).

The third PMOS transistor Tr6 is connected in parallel with the second PMOS transistor Tr2. The activation signal φ indicative of the active mode is supplied to a gate of the third PMOS transistor Tr6 and a gate of the NMOS transistor Tr5.

Output signals generated at drains of the second and third PMOS transistors Tr2, Tr6, and an output signal generated at a drain of the third NMOS transistor Tr4 are supplied to the inverter 52.

The first detector circuit 12 is activated by the activation signal φ indicative of the active mode, and generates the detection signal DET-A at H-level for activating the oscillator circuit 33 when the divided voltage of the boosted voltage VPP is equal to or smaller than the reference voltage Vref.

Figure 5:
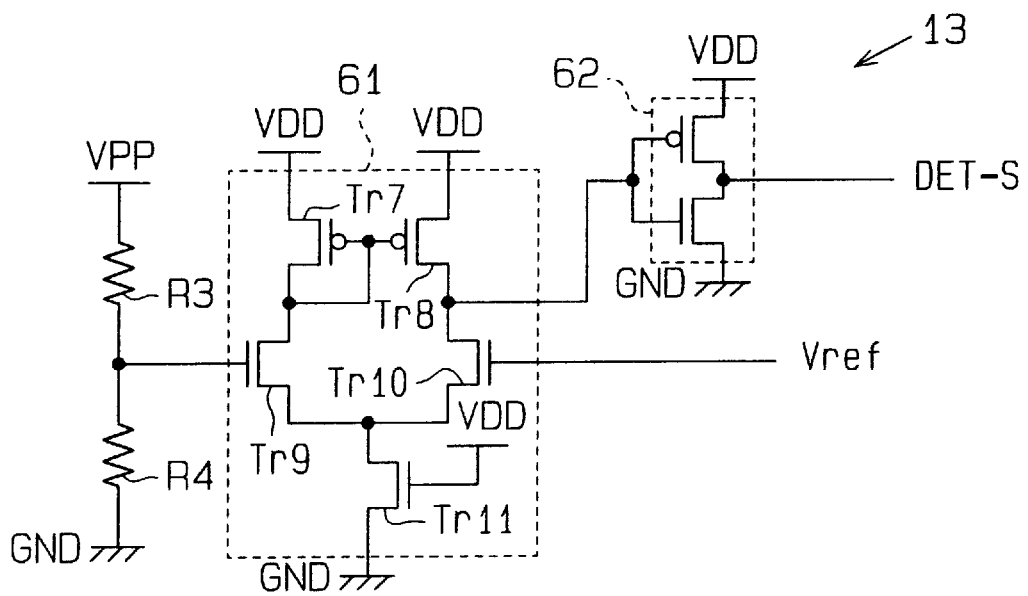
FIG. 5 is a schematic circuit diagram of a second detector circuit of the boosted power generator circuit of FIG. 2

As illustrated in FIG. 5, the second detector circuit 13 includes resistors R3, R4; a current mirror 61; and an inverter 62. The current mirror 61 includes two PMOS transistors Tr7, Tr8; and three transistors Tr9, Tr10, Tr11.

The boosted voltage VPP generated by the charge pump circuit 16 is divided by the resistors R3, R4, so that a divided voltage is supplied to a first input terminal of the current mirror 61 (a gate of the first NMOS transistor Tr9). A reference voltage Vref is supplied to a second input terminal of the current mirror 61 (a gate of the second NMOS transistor Tr10). The supply voltage VDD is supplied to a gate of the third NMOS transistor Tr11. The second detector circuit 13 is activated at all times as long as the supply voltage VDD is supplied in the active mode and standby mode.

The second detector circuit 13 operates irrespective of the active mode or standby mode, and generates the detection signal DET-S having H-level for activating the oscillator circuit 15 when the divided voltage of the boosted voltage VPP is equal to or smaller than the reference voltage Vref.

Figure 6:
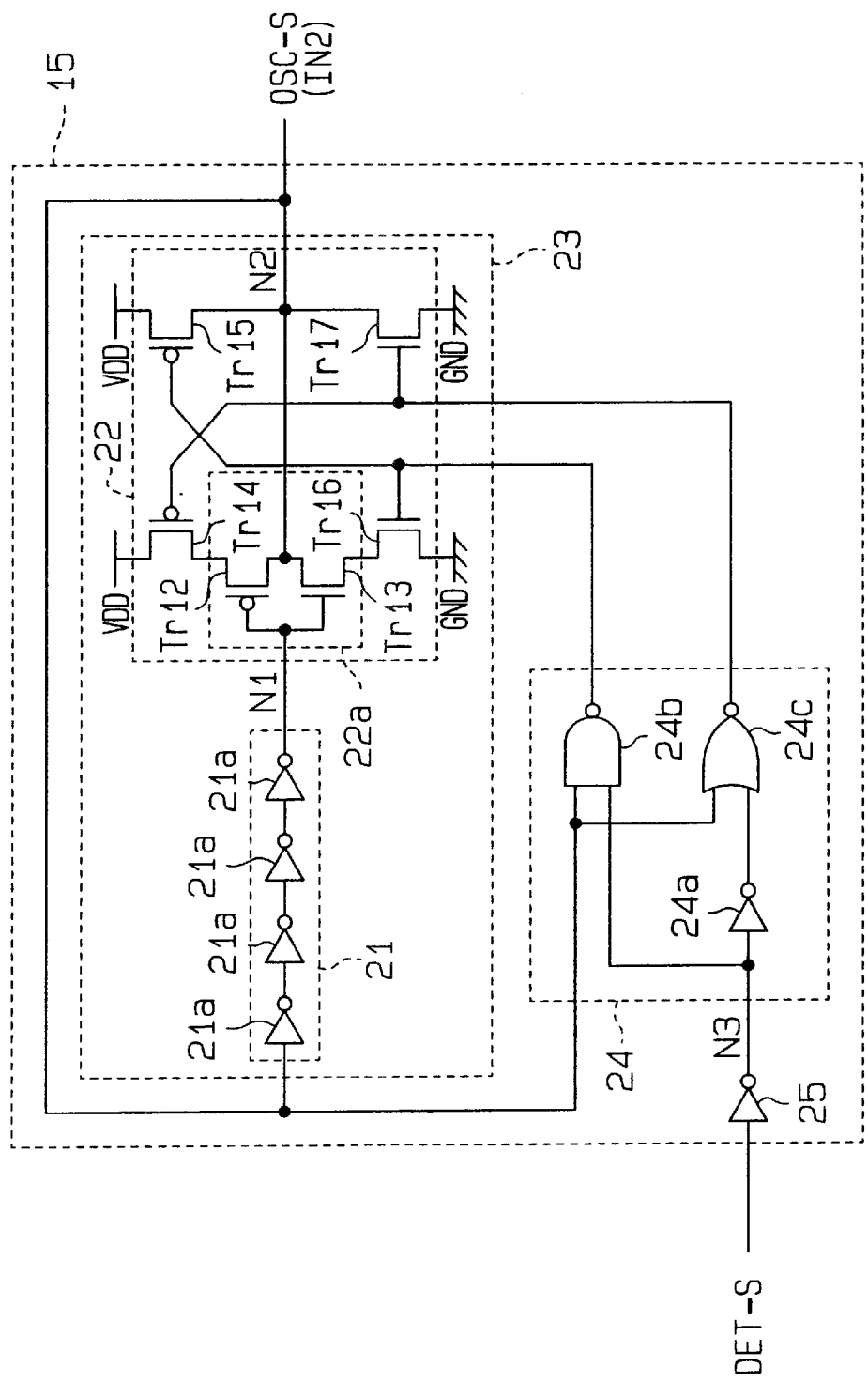
FIG. 6 is a schematic circuit diagram of an oscillator circuit of the boosted power generator circuit of FIG. 2.

As illustrated in FIG. 6, the oscillator circuit 15 includes a periodic circuit 23; a switch control circuit 24; and an inverter gate 25. The periodic circuit 23 includes a periodic delay circuit 21 and a switch circuit 22.

The switch circuit 22 includes an inverter 22a comprised of a PMOS transistor Tr12 and an NMOS transistor Tr13; two PMOS transistors Tr14, Tr15; and two NMOS transistors Tr16, Tr17. The periodic delay circuit 21 includes inverters 21a at an even number of stages (for example, four stages).

An output terminal of the periodic delay circuit 21 (a node N1) is connected to an input terminal of the inverter 22a (gates of the transistors Tr12, Tr13) of the switch circuit 22. An output terminal of the inverter 22a is connected to an input terminal of the periodic delay circuit 21 (the inverter at the first stage). An odd number of stages of inverters (the four inverters 21a and inverter 22a) are connected to the periodic circuit 23 in a loop configuration to form a ring oscillator.

The PMOS transistor Tr14 has its source connected to the supply voltage VDD, and its drain connected to a source of the PMOS transistor Tr12 of the inverter 22a. The NMOS transistor Tr16 has its source connected to a ground GND, and its drain connected to a source of the NMOS transistor Tr13 of the inverter 22a. Therefore, when the transistors Tr14, Tr16 are turned on, the periodic circuit 23 is activated to generate the oscillator signal OSC-S having the second frequency.

The PMOS transistor Tr15 has its source connected to the supply voltage VDD, and its gate connected to a gate of the NMOS transistor Tr16. The NMOS transistor Tr17 has its source connected to the ground GND, and its gate connected to a gate of the transistor Tr14.

The PMOS transistor Tr15 and NMOS transistor Tr17 have their drains connected to each other, and a connection node N2 is connected to the output terminal of the inverter 22a (drains of the transistors Tr12, Tr13). The oscillator signal OSC-S is output from the node N2.

The switch control circuit 24 is comprised of a plurality of logic circuits. For example, the switch control circuit 24 includes an inverter 24a; a NAND circuit 24b; and a NOR circuit 24c.

The inverter 24a has its input terminal connected to an output terminal of the inverter gate 25 (node N3), which is connected to a first input terminal of the NAND circuit 24b. The NAND circuit 24b is supplied with the oscillator signal OSC-S at its second input terminal. The oscillator signal OSC-S is supplied to a first input terminal of the NOR circuit 24c which has a second input terminal supplied with an output signal of the inverter 24a.

An output signal of the NAND circuit 24b is supplied to a gate of the NMOS transistor Tr16 and to a gate of the PMOS transistor Tr15. An output signal of the NOR circuit 24c is supplied to a gate of the NMOS transistor Tr17 and to a gate of the PMOS transistor Tr14. In the foregoing configuration, the switch control circuit 24 controls activation/deactivation of the periodic circuit 23.

In the oscillator circuit 15, when the inverter gate 25 is supplied with the detection signal DET-S having H-level from the second detector circuit 13, the inverter gate 25 outputs an output signal having L-level. In other words, the voltage at the node N3 is set to L-level. This causes the NAND circuit 24b to output a signal having H-level, and the NOR circuit 24c to output a signal having L-level, so that the transistors Tr14, Tr16 are turned on, and the transistors Tr15, Tr17 are turned off. Consequently, the inverter 22a is activated, and the periodic circuit 23 generates the oscillator signal OSC-S having the second frequency.

When the inverter gate 25 is supplied with the detection signal having L-level from the second detector 13, the inverter gate 25 outputs an output signal having H-level. In other words, the voltage at the node N3 is set to H-level. In this state, when the periodic circuit 23 is outputting the oscillator signal OSC-S having L-level, the NAND circuit 24b and NOR circuit 24c both output signals having H-level. This causes the transistors Tr14, Tr15 to turn off, and the transistors Tr16, Tr17 to turn on. Consequently, the inverter 22a is deactivated to stop the operation of the periodic circuit 23. In this event, the oscillator signal OSC-S is clamped to L-level (connected to the ground GND) by the transistor Tr17 which has been turned on.

Also, when the inverter gate 25 is outputting an output signal having H-level and the periodic circuit 23 is outputting the oscillator signal OSC-S having H-level, the NAND circuit 24b and NOR circuit 24c both output signals having L-level. This causes the transistors Tr14, Tr15 to turn on, and the transistors Tr16, Tr17 to turn off. Consequently, the inverter 22a is deactivated to stop the operation of the periodic circuit 23. In this event, the oscillator signal OSC-S is clamped to H-level (connected to the supply voltage VDD) by the transistor Tr15 which has been turned on.

Figure 7:
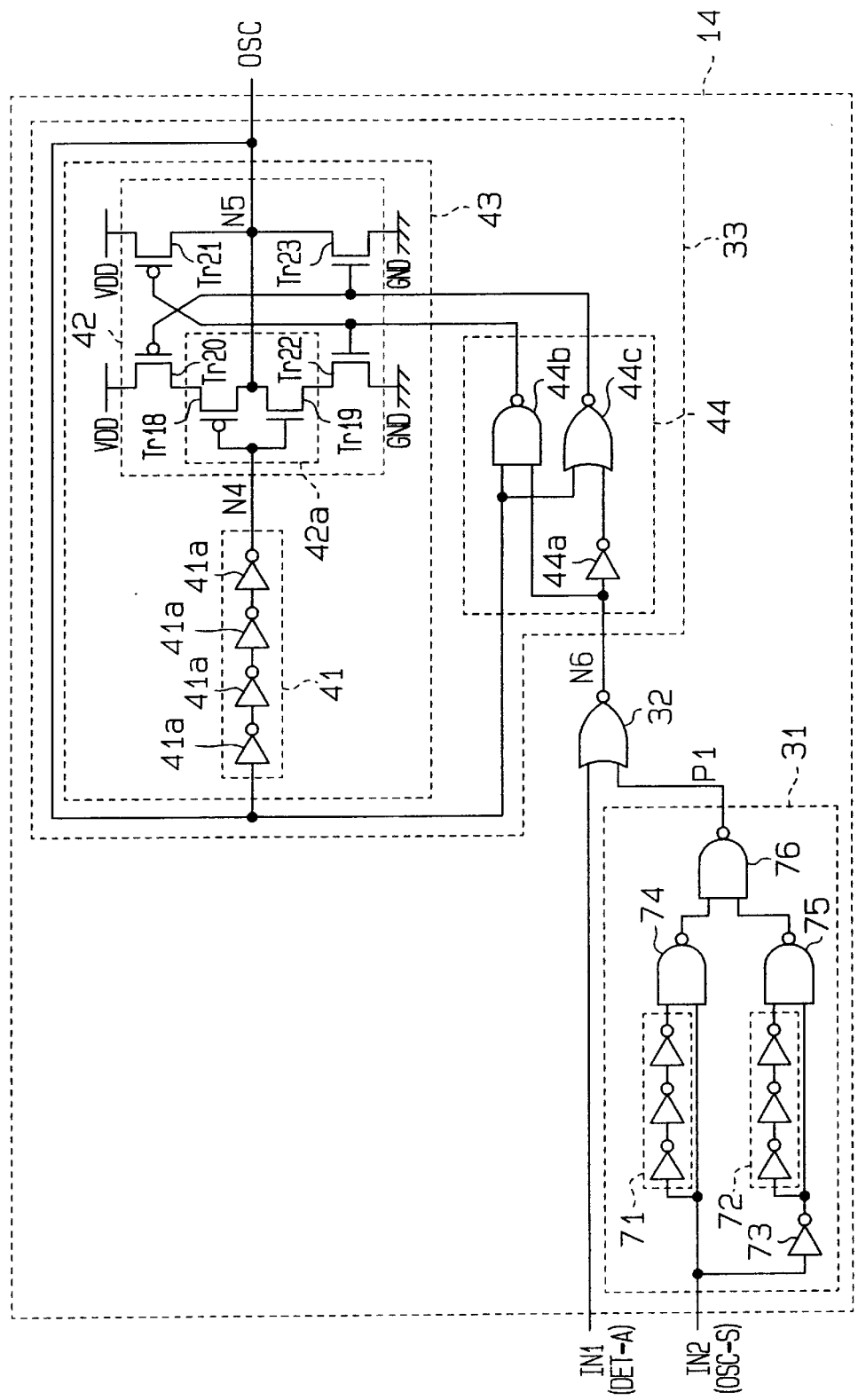
FIG. 7 is a schematic circuit diagram of an incorrect pulse preventing circuit of the boosted power generator circuit of FIG. 2.

As illustrated in FIG. 7, the incorrect pulse preventing circuit 14 includes a pulse generator circuit 31; a synthesizer 32; and an oscillator circuit 33.

The pulse generator circuit 31, which is comprised of a plurality of logic circuits, generates a pulse in response to a pulse edge of the oscillator signal OSC-S (second control signal IN2) output from the oscillator circuit 15. In other words, the pulse generator circuit 31 is an edge triggered circuit. The pulse generator circuit 31 includes two delay circuits 71, 72 each comprised of an odd number (for example, three stages) of inverters; an inverter 73; and three NAND circuits 74, 75, 76.

A first NAND circuit 74 is supplied at its first input terminal with the oscillator signal OSC-S, and supplied at its second input terminal with the oscillator signal OSC-S which is delayed by the first delay circuit 71 and inverted. The oscillator signal OSC-S is inverted by the inverter 73, and the inverted oscillator signal OSC-S is supplied to a first input terminal of a second NAND circuit 75. The second NAND circuit 75 is supplied at its second input terminal with an output signal of the inverter 73 which is delayed by the second delay circuit 72 and inverted. Output signals of the NAND circuits 74, 75 are supplied to a third NAND circuit 76.

In response to pulse edges (a rising edge and a falling edge) of the oscillator signal OSC-S having the second frequency, the third NAND circuit 76 outputs a pulse signal P1. Specifically, the pulse generator circuit 31 generates the pulse signal P1 having an H-level pulse width corresponding to delay times of the delay circuits 71, 72 in response to a pulse edge of the oscillator signal OSC-S. In other words, the pulse signal P1 has a frequency twice the second frequency.

The periodic circuit 43 of the oscillator circuit 33 operates in a half-period (or a complete period) of the oscillator signal OSC-S having the second frequency in response to the pulse signal P1. Specifically, the pulse generator circuit 31 generates the pulse signal P1 which has a pulse formed for a duration shorter than the time in which the periodic circuit 43 is operated in a half-period (or a complete period). The pulse width of the pulse signal P1 is set according to the delay times of the first and second delay circuits 71, 72.

The synthesizer 32 is comprised of a NOR circuit. The NOR circuit receives the detection signal DET-A (first control signal IN1) from the first detector circuit 12, and the pulse signal P1 from the pulse generator circuit 31, and generates an output signal at L-level when the NOR circuit receives the detection signal DET-A at H-level for activating the oscillator circuit 33 or the pulse signal P1 at H level.

The oscillator circuit 33 includes a periodic circuit 43 and a switch control circuit 44. The periodic circuit 43 includes a periodic delay circuit 41 and a switch circuit 42. In other words, the oscillator circuit 33 has the same configuration as the oscillator circuit 15.

A transistor comprising each inverter 41a of the periodic delay circuit 41 has a device parameter (for example, a channel width) different from that of the transistor comprising each inverter 21a of the periodic delay circuit 21 of FIG. 6. Then, the oscillator circuit 33 generates an oscillator signal having an oscillating frequency (i.e., the first frequency) different from the oscillating frequency (second frequency) of the oscillator circuit 15 (first frequency>second frequency). Alternatively, the number of inverters of the periodic delay circuit 41 may be chosen to be different from the number of inverters in the periodic delay circuit 21 to generate oscillator signals at different oscillating frequencies.

The switch control circuit 44 controls activation/deactivation of the periodic circuit 43, and the periodic circuit 43 outputs the oscillator signal OSC from a node N5. Specifically, when the synthesizer 32 outputs an output signal having L-level (when the node N6 falls to L-level), the inverter 42a of the switch circuit 42 is causing the periodic circuit 43 to operate. When the synthesizer 32 outputs an output signal having H-level (when the node N6 rises to H-level), the inverter 42a is deactivated, causing the periodic circuit 43 to stop operating. Then, when the periodic circuit 43 is outputting the oscillator signal OSC having L-level, the oscillator signal OSC is clamped to L-level by the transistor Tr23 which has been turned on. Also, when the periodic circuit 43 is outputting the oscillator signal OSC having H-level, the oscillator signal OSC is clamped to H-level by the transistor Tr21 which has been turned on.

In the foregoing manner, the incorrect pulse preventing circuit 14 generates the oscillator signal OSC in response to the detection signal DET-A or oscillator signal OSC-S.

Specifically, when the synthesizer 32 is supplied with the detection signal DET-A having H-level (active mode), the transistors Tr20, Tr22 are turned on, while the transistors Tr21, Tr23 are turned off. Consequently, the oscillator circuit 33 generates the oscillator signal OSC having the first frequency.

When the synthesizer 32 is supplied with the detection signal DET-A having L-level (in the standby mode), the oscillator circuit 33 intermittently operates in response to the pulse signal P1. The pulse generator circuit 31 is triggered by an edge of the oscillator signal OSC-S to generate the pulse signal P1 which has H-level for a predetermined duration. This causes the synthesizer 32 to output a pulse signal having L-level (see FIG. 9(b)), so that the inverter 42a of the switch circuit 42 of the oscillator circuit 33 is activated.

Figure 9A:
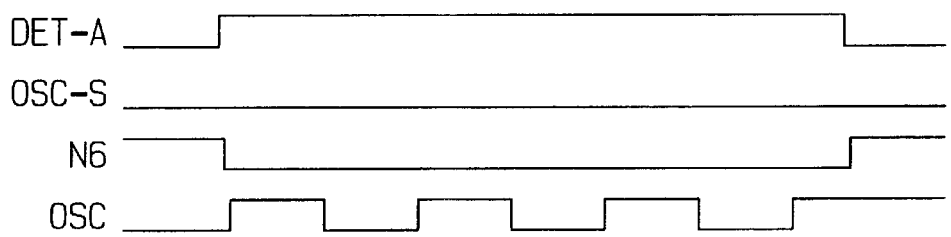
FIGS. 9(a) through 9(c) are waveform charts for describing the operation of the boosted power generator circuit of FIG. 2.
Figure 9B:
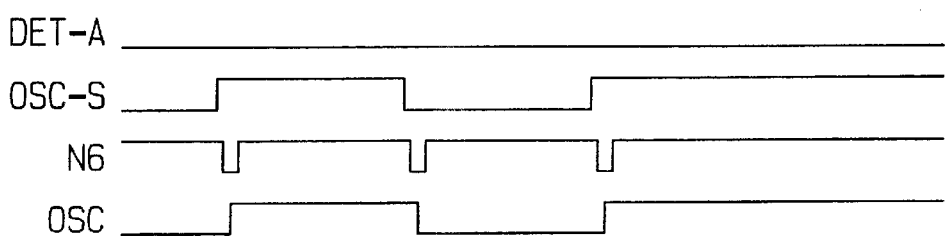

In this event, as shown in FIG. 9(b), when the voltage of the oscillator signal OSC is, for example, at L-level, the voltage at an output terminal (node N4) of the periodic delay circuit 41 is also at L-level. Therefore, when the inverter 42a is activated, the oscillator circuit 33 immediately outputs the oscillator signal OSC having H-level. The pulse signal at L-level from the synthesizer 32 rises to H-level before the inverted oscillator signal OSC is transmitted to the node N4 (or before the voltage at the node N4 is changed by the periodic delay circuit 41), to deactivate the inverter 42a. A NAND circuit 44b of the switch control circuit 44 outputs a signal having L-level in response to the oscillator signal OSC having H-level. The L-level signal turns on the transistor Tr21 which clamps the oscillator signal OSC to H-level. As a result, the periodic circuit 43 of the oscillator circuit 33 operates in a half-period of the oscillator signal OSC-S having the second frequency.

Subsequently, when the synthesizer 32 outputs a pulse signal having L-level in response to the pulse signal P1 having H-level, the voltage at the output terminal (node N4) of the periodic delay circuit 41 is at H-level because the oscillator signal OSC is clamped to H-level. Therefore, when the inverter 42a is activated, the oscillator circuit 33 immediately outputs the oscillator signal OSC having L-level. The L-level pulse signal from the synthesizer 32 rises to H-level before the inverted oscillator signal OSC is transmitted to the node N4 (or before the voltage at the node N4 is changed by the periodic delay circuit 41), to deactivate the inverter 42a. Then, a NOR circuit 44c outputs a signal having H-level in response to the oscillator signal OSC having L-level. The H-level signal turns on the transistor Tr23 which clamps the oscillator signal OSC to L-level. As a result, the periodic circuit 43 in the oscillator circuit 33 operates in a half-period.

As described above, the oscillator circuit 33 generates the oscillator signal OSC having a period synchronized to the period of the second oscillator signal OSC-S when the synthesizer 32 is supplied with the detection signal DET-A at L-level (standby mode).

The periodic circuit 43 of the oscillator circuit 33 may operate in a complete period in response to the pulse signal P1 from the pulse generator circuit 31, rather than operates in a half-period.

Figure 8:
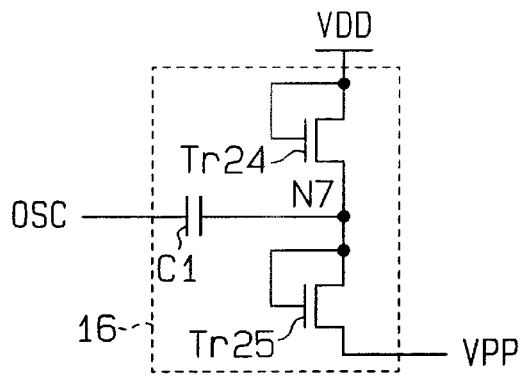
FIG. 8 is a schematic circuit diagram of a charge pump circuit of the boosted power generator circuit of FIG. 2.

As illustrated in FIG. 8, the charge pump circuit 16 includes transistors Tr24, Tr25, each functioning as a diode; and a capacitor C1. The capacitor C1 has an output terminal connected to a node N7 between the transistors Tr24 and Tr25.

The capacitor C1 is supplied with the oscillator signal OSC at its input terminal. Each of the transistors Tr24, Tr25 is, for example, comprised of an NMOS transistor having its gate connected to its drain to form a MOS diode. The transistor Tr24 has a drain connected to a high potential power supply VDD, and the boosted voltage VPP is output from a source of the transistor Tr25.

When the oscillator signal OSC at L-level is supplied, the capacitor C1 is charged by the high potential power supply VDD, resulting in the node N7 set at a voltage smaller by a threshold value of the transistor Tr24 than the voltage of the high potential power supply VDD.

Subsequently, when the oscillator signal OSC at H-level is supplied, the voltage at the node N7 is boosted by capacitive coupling of the capacitor C1. Then, when the voltage at the node N7 becomes greater by a threshold value of the transistor Tr25 than the boosted voltage VPP, a charge from the capacitor C1 is supplied to boost the boosted voltage VPP.

In this manner, the oscillator signal OSC at H-level or L-level is repeatedly supplied to generate the boosted voltage VPP.

Next, the operation of the boosted power generator circuit 11 will be described with reference to FIGS. 9(a)–9(c).

As shown in FIG. 9(a), when the first detector circuit 12 outputs the detection signal DET-A at H-level indicative of the active mode, the voltage at the output terminal (node N6) of the synthesizer 32 falls to L-level. Then, the oscillator circuit 33 generates the oscillator signal OSC having the first frequency. Subsequently, when the first detector circuit 12 outputs the detection signal DET-A at L-level to release the active mode, the voltage at the node N6 rises to H-level, thereby deactivating the oscillator circuit 33. At this time, the oscillator signal OSC is clamped to H-level.

Next, as shown in FIG. 9(b), when the first detector circuit 12 outputs the detection signal DET-A at L-level, and the oscillator circuit 15 supplies the oscillator signal OSC-S, a pulse at L-level is generated at the node N6. At this time, the pulse at L-level is generated in response to a pulse edge of the oscillator signal OSC-S having the second frequency. Therefore, the oscillator circuit 33 oscillates substantially at the same period as the second oscillator signal OSC-S.

Next, description will be given for the case where the oscillator signal OSC-S is supplied in a short time period after the first detector circuit 12 outputs the detection signal DET-A at L-level (after releasing the active mode).

Figure 9C:
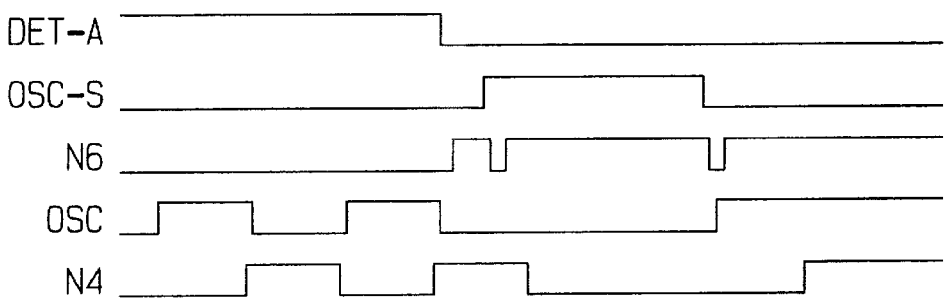

As shown in FIG. 9(c), assume that the oscillator circuit 33 is now outputting the oscillator signal OSC having the first frequency in response to the detection signal DET-A at H-level.

Next, as the oscillator circuit 33 is supplied with the detection signal DET-A at L-level, the voltage at the node N6 rises to H-level, thereby deactivating the oscillator circuit 33. In this event, the oscillator signal OSC is clamped to L-level.

When a pulse (H-level pulse) of the oscillator signal OSC-S is supplied immediately after switching to the detection signal DET-A at L-level, an L-level pulse is generated at the node N6, thereby activating the inverter 42a to release the oscillator signal OSC clamped to L-level. However, since the oscillator signal OSC at L-level is delayed by the periodic delay circuit 41 at that time, the voltage at the node N4 is still maintained at H-level. For this reason, the oscillator circuit 33 outputs the oscillator signal OSC at L-level for a predetermined time period. Further, as shown in FIG. 9(c), since the L-level pulse generated at the node N6 disappears within a short period, the inverter 42a of the switch circuit 42 is deactivated before the voltage at the node N4 falls down. In other words, the periodic circuit 43 stops its operation with the oscillator signal OSC maintained at L-level.

With the foregoing operation, the oscillator circuit 33 will not generate the oscillator signal OSC which has a period shorter than the period of the first frequency. This applies also to the case where the detection signal at H-level is supplied immediately after the oscillator circuit 15 supplies the oscillator signal OSC-S.

Figure 10:
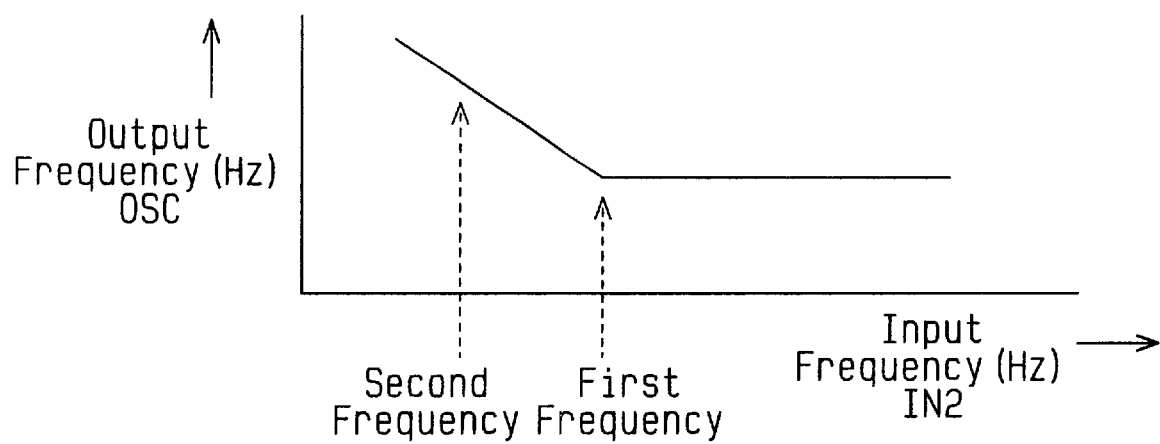
FIG. 10 is a graph showing the relationship between an input frequency and an output frequency of the boosted power generator circuit of FIG. 2.

FIG. 10 is a graph showing the relationship between an input frequency and an output frequency of the incorrect pulse preventing circuit 14. The incorrect pulse preventing circuit 14 receives the oscillator signal OSC-S, and stably generates the oscillator signal OSC having a frequency smaller than the first frequency.

The boosted power generator circuit 11 according to the first embodiment has the following advantages.

(1) The oscillator circuit 33 of the incorrect pulse preventing circuit 14 generates the oscillator signal OSC having the first frequency when the synthesizer 32 is supplied with the detection signal DET-A in the active mode. The oscillator circuit 33 generates the oscillator signal OSC having the same period as the period of the oscillator signal OSC-S having the second frequency in response to the oscillator signal OSC-S supplied from the oscillator circuit 15 through the pulse generator circuit 31 in the standby mode. Therefore, no oscillator signal OSC having a period (pulse width) shorter than the period of the first frequency will be output from the incorrect pulse preventing circuit 14. Consequently, the charge pump circuit 16 provides a stable charge pump operation, resulting in stabilization of the boosted voltage VPP and efficient supply thereof.

(2) Even when the mode is switched, or when a change in the detection signal DET-A overlaps a change in the oscillator signal OSC-S, the incorrect pulse preventing circuit will not generate the oscillator signal OSC having a pulse width shorter than the period of the oscillator signal having the first frequency.

(3) Since a single charge pump is connected to the oscillator circuits 15, 33, an increase in the semiconductor die size is prevented.

Figure 11:
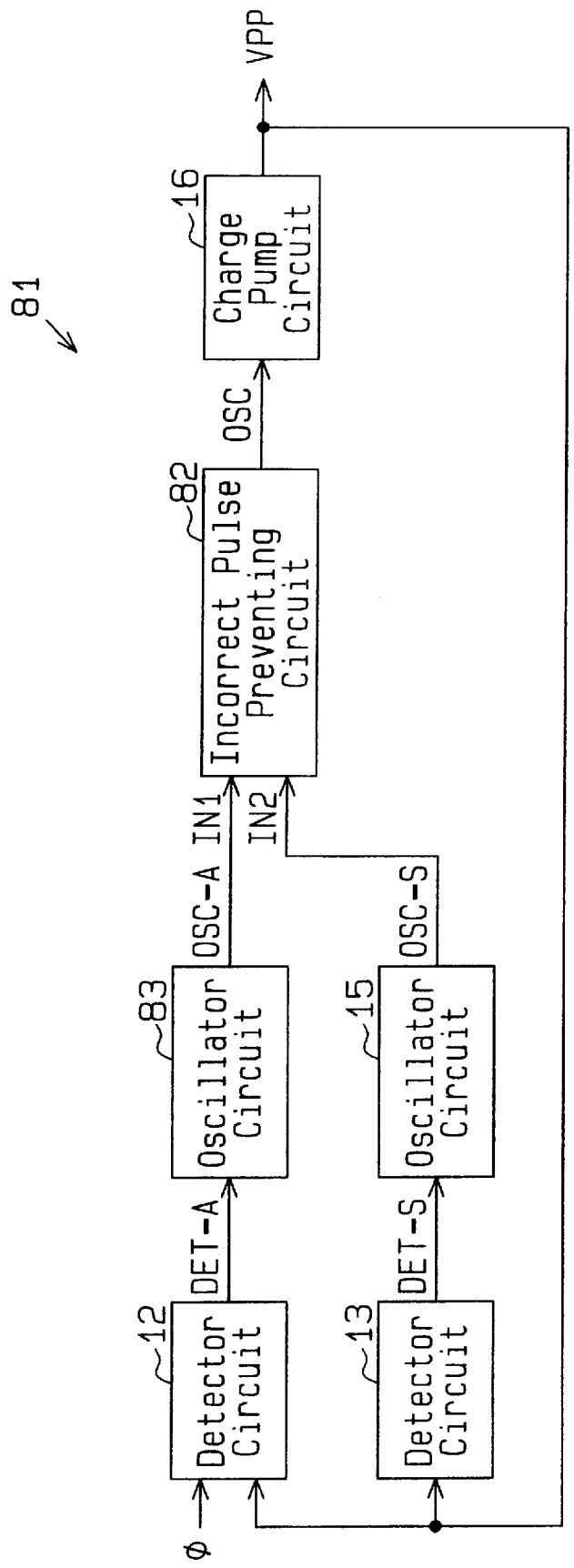
FIG. 11 is a schematic block diagram of a boosted power generator circuit according to a second embodiment of the present invention.

In the following, a boosted power generator circuit 81 according to a second embodiment of the present invention will be described with reference to FIGS. 11 and 12. The boosted power generator circuit 81 includes first and second detector circuits 12, 13; an incorrect pulse preventing circuit 82; oscillator circuits 15, 83; and a charge pump circuit 16. In the second embodiment, the oscillator circuit 83 supplies the incorrect pulse preventing circuit 82 with an oscillator signal OSC-A (a first control signal IN1) in response to a detection signal DET-A of the first detector circuit 12.

The oscillator circuit 83 has the same configuration as the oscillator circuit 15, so that detailed description thereof is omitted. The oscillator circuit 83 generates an oscillator signal having a third frequency smaller than the first frequency of the oscillator circuit 33. Also, the third frequency is greater than the second frequency of the oscillator circuit 15. Expressed in another way, first frequency>third frequency>second frequency is established.

Figure 12:
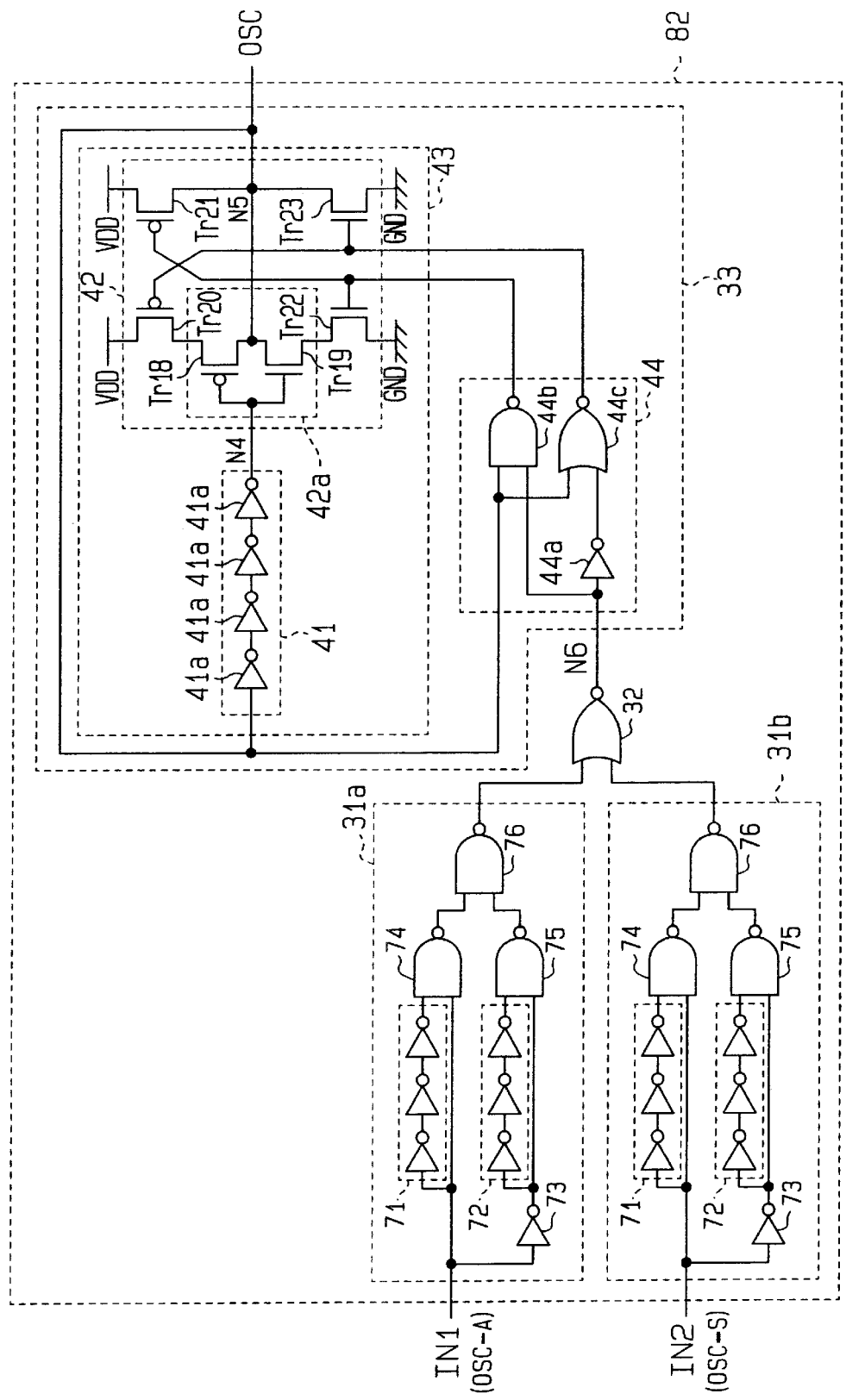
FIG. 12 is a schematic circuit diagram of an incorrect pulse preventing circuit of the boosted power generator circuit of FIG. 11.

As illustrated in FIG. 12, the incorrect pulse preventing circuit 82 includes a first and a second pulse generator circuit 31a, 31b; a synthesizer 32; a periodic circuit 43; and a switch control circuit 44. Each of the first and second pulse generator circuits 31a, 31b has the same configuration as the pulse generator circuit 31 in FIG. 7. The synthesizer 32 is supplied with a pulse signal output from the first pulse generator 31a in response to the oscillator signal OSC-A (the first control signal IN1), and with a pulse signal output from the second pulse generator circuit 31b in response to an oscillator signal OSC-S (a second control signal IN2).

Next, the operation of the boosted power generator circuit 81 will be described. The first detector circuit 12 supplies the third oscillator circuit 83 with the detection signal DET-A having H-level when a divided voltage of the boosted voltage VPP is equal to or smaller than a reference voltage Vref in the active mode. The third oscillator circuit 83 generates the oscillator signal OSC-A having the third frequency in response to the detection signal DET-A at H-level.

The synthesizer 32 of the incorrect pulse preventing circuit 82 is supplied with the oscillator signal OSC-A through the first pulse generator circuit 31a, and the oscillator circuit 33 oscillates at the same frequency as the third frequency. Therefore, the incorrect pulse preventing circuit 82 outputs the oscillator signal having the same frequency as the third frequency.

The charge pump circuit 16 performs a boost operation in accordance with the oscillator signal OSC to generate a boosted voltage VPP. When a divided voltage of the boosted voltage VPP rises to a voltage equal to or grater than the reference voltage Vref, the first detector circuit 12 outputs the detection signal DET-A having L-level, thereby deactivating the third oscillator circuit 83 and incorrect pulse preventing circuit 82. Consequently, the charge pump circuit 16 stops its operation.

The second detector circuit 13 supplies the oscillator circuit 15 with a detection signal DET-S having H-level, when the divided voltage of the boosted voltage VPP is equal to or smaller than the reference voltage Vref. The oscillator circuit 15 generates the oscillator signal OSC-S having the second frequency in response to the detection signal DET-S at H-level.

The synthesizer 32 is supplied with the oscillator signal OSC-S through the second pulse generator circuit 31b, and the oscillator circuit 33 oscillates at the same frequency as the second frequency. Therefore, the incorrect pulse preventing circuit 82 outputs the oscillator signal having the same frequency as the second frequency.

The charge pump circuit 16 performs a boost operation in accordance with the oscillator signal OSC to generate the boosted voltage VPP. The second detector circuit 13 outputs the detection signal DET-S having L-level when the divided voltage of the boosted voltage VPP rises to a voltage equal to or greater than the reference voltage Vref, thereby deactivating the oscillator circuit 15 and incorrect pulse preventing circuit 82. Therefore, the charge pump circuit 16 stops its operation.

In the second embodiment, the frequency of the oscillator signal OSC of the incorrect pulse preventing circuit 82 is switched each time the first and second control signals IN1, IN2 (oscillator signals OSC-A, OSC-S) are switched. Therefore, the boosted power generator circuit 81 of the second embodiment has the same advantages as the boosted power generator circuit 11 of the first embodiment.

It should be apparent to those skilled in the art that the present invention may be embodied in many other specific forms without departing from the spirit or scope of the invention. Particularly, it should be understood that the invention may be embodied in the following forms.

The periodic delay circuit 41 of the periodic circuit 43 may be comprised of an even number of inverters 41a such as two, six and the like.

Oscillator signals having different oscillating frequencies may be generated by providing a number of inverters comprising the periodic delay circuit 41 of the oscillator circuit 33 different from the number of inverters comprising the periodic delay circuit 21 of the oscillator circuit 15.

The present invention may be applied to memory devices such as SDRAM and the like. In this case, the boosted power generator circuit may be supplied with a system clock as the first control signal IN1 and with a self-refresh request signal as the second control signal IN2.

The present invention may be applied to a negative power generator circuit as well as the boosted power generator circuits 11, 81.

Therefore, the present examples and embodiments are to be considered as illustrative and not restrictive and the invention is not to be limited to the details given herein, but may be modified within the scope and equivalence of the appended claims.

What is claimed is:

1. A method of controlling an oscillator circuit having a periodic circuit which includes a switch circuit, the method comprising the steps of:

operating the periodic circuit using the switch circuit in response to a first control signal when the first control signal is in a first state to generate a first oscillator signal having a first frequency; and operating the periodic circuit using the switch circuit in response to a second control signal when the first control signal is in a second state to generate a second oscillator signal having a period synchronized to a period of the second control signal having a second frequency.

2. The method according to claim 1, wherein the step of generating a second oscillator signal includes operating the periodic circuit in a half-period or a complete period of the second control signal using the switch circuit.

3. The method according to claim 1, wherein the step of generating a second oscillator signal includes controlling the periodic circuit by the switch circuit to operate intermittently.

4. The method according to claim 1, wherein the first frequency is greater than the second frequency.

5. A method of controlling an oscillator circuit having a periodic circuit which includes a switch circuit, the method comprising the steps of:

operating the periodic circuit in response to a first control signal using the switch circuit to generate a first oscillator signal synchronized in phase to the first control signal; and operating the periodic circuit in response to a second control signal using the switch circuit to generate a second oscillator signal synchronized in phase to the second control signal.

6. An oscillator circuit comprising:

a synthesizer for synthesizing a first control signal with a pulse signal to generate a synthesized signal;

a pulse generator circuit connected to the synthesizer for generating the pulse signal in response to a second control signal and supplying the pulse signal to the synthesizer;

a control circuit connected to the synthesizer for generating a switch control signal in accordance with the synthesized signal; and a periodic circuit connected to the control circuit, and including a switch circuit responsive to the switch control signal, wherein the periodic circuit generates one of a first oscillator signal having a first frequency and a second oscillator signal having a second frequency in accordance with an operation of the switch circuit.

7. The oscillator circuit according to claim 6, wherein the second control signal has a frequency smaller than a frequency of the first control signal.

8. The oscillator circuit according to claim 6, wherein the pulse signal operates the periodic circuit in a half-period or a complete period of the second control signal.

9. The oscillator circuit according to claim 6, wherein the pulse signal has a pulse formed in a duration shorter than a time period in which the periodic circuit is operated in a half-period or a complete period of the second control signal.

10. An oscillator circuit comprising:

a first pulse generator circuit for generating a first pulse signal in response to a first control signal;

a second pulse generator circuit for generating a second pulse signal in response to a second control signal;

a synthesizer connected to the first and second pulse generator circuits for synthesizing the first pulse signal and the second pulse signal to generate a synthesized signal;

a control circuit connected to the synthesizer for generating a switch control signal in accordance with the synthesized signal; and a periodic circuit connected to the control circuit, and including a switch circuit responsive to the switch control signal, wherein the periodic circuit generates one of a first oscillator signal corresponding to the first control signal and having a first frequency and a second oscillator signal corresponding to the second control signal and having a second frequency in accordance with an operation of the switch circuit.

11. The oscillator according to claim 10, wherein the second control signal has a frequency smaller than a frequency of the first control signal.

12. The oscillator according to claim 10, wherein the periodic circuit is operated in a shorter duration than a half-period or a complete period of the first control signal in response to the first pulse signal, and the periodic circuit is operated in a shorter duration than a half-period or a complete period of the second control signal in response to the second pulse signal.

13. A method of controlling an internal power generator circuit, the internal power generator circuit comprising an oscillator circuit having a periodic circuit including a switch circuit, and a charge pump circuit connected to the oscillator circuit, the method comprising the steps of:

operating the periodic circuit in response to a first control signal using the switch circuit, when the first control signal is in a first state, to generate a first oscillator signal having a first frequency;

generating a voltage in accordance with the first oscillator signal using the charge pump circuit;

operating the periodic circuit in response to a second control signal using the switch circuit, when the first control signal is in a second state, to generate a second oscillator signal having a period synchronized to a period of the second control signal having a second frequency; and generating the voltage in accordance with the second oscillator signal using the charge pump circuit.

14. The method according to claim 13, wherein the step of generating a second oscillator signal includes operating the periodic circuit in a half-period or a complete period of the second control signal using the switch circuit.

15. A method of controlling an internal power generator circuit, the internal power generator circuit comprising an oscillator circuit including a periodic circuit having a switch circuit, and a switch control circuit for controlling the switch circuit, and a charge pump circuit connected to the oscillator circuit, the method comprising the steps of:

controlling the switch circuit in response to a first control signal by the switch control circuit to operate the periodic circuit to generate a first oscillator signal having a period synchronized to a period of the first control signal;

generating a voltage in accordance with the first oscillator signal using the charge pump circuit;

controlling the switch circuit in response to a second control signal by the switch control circuit to operate the periodic circuit to generate a second oscillator signal having a period synchronized to a period of the second control signal; and generating the voltage in accordance with the second oscillator signal using the charge pump circuit.

16. An internal power generator circuit comprising:

a first oscillator circuit including:
  a synthesizer for synthesizing a first control signal with a pulse signal to generate a synthesized signal;
  a pulse generator circuit connected to the synthesizer for generating a pulse signal in response to a second control signal and supplying the synthesizer with the pulse signal;
  a control circuit connected to the synthesizer for generating a switch control signal in accordance with the synthesized signal; and
  a periodic circuit connected to the control circuit and including a switch circuit responsive to the switch control signal, wherein the periodic circuit generates one of a first oscillator signal having a first frequency and a second oscillator signal having a second frequency in accordance with an operation of the switch circuit; and a charge pump circuit connected to the periodic circuit for generating a voltage in accordance with one of the first oscillator signal and the second oscillator signal.

17. The internal power generator circuit according to claim 16, wherein the pulse signal operates the periodic circuit in a half-period or a complete period of the second control signal.

18. The internal power generator circuit according to claim 16, further comprising:

a second oscillator circuit connected to the pulse generator circuit for generating a second control signal having a second frequency smaller than the first frequency, and supplying the pulse generator circuit with the second control signal.

19. The internal power generator circuit according to claim 16, wherein the pulse signal has a pulse formed in a shorter duration than a time period in which the periodic circuit is operated in a half-period or a complete period of the second control signal.

20. The internal power generator circuit according to claim 16, further comprising:
   a first detector circuit connected to the charge pump circuit for detecting a voltage of the charge pump circuit to generate the first control signal based on the result of detection; and
   a second detector circuit connected to the charge pump circuit for detecting the voltage of the charge pump circuit to generate the second control signal based on the result of detection.

21. An internal power generator circuit comprising:
   a first oscillator circuit including:
      a first pulse generator circuit for generating a first pulse signal in response to a first control signal;
      a second pulse generator circuit for generating a second pulse signal in response to a second control signal;
      a synthesizer connected to the first and second pulse generator circuits for synthesizing the first pulse signal and the second pulse signal to generate a synthesized signal;
      a control circuit connected to the synthesizer for generating a switch control signal in accordance with the synthesized signal; and
      a periodic circuit connected to the control circuit, and including a switch circuit responsive to the switch control signal, wherein the periodic circuit generates one of a first oscillator signal corresponding to the first control signal and having a first frequency and a second oscillator signal corresponding to the second control signal and having a second frequency in accordance with an operation of the switch circuit; and
   a charge pump circuit connected to the periodic circuit for generating a voltage in accordance with one of the first oscillator signal and the second oscillator signal.

22. The internal power generator circuit according to claim 21, further comprising:
   a second oscillator circuit connected to the first pulse generator circuit for generating the first control signal; and
   a third oscillator circuit connected to the second pulse generator circuit for generating the second control signal having a frequency smaller than a frequency of the first control signal.

23. The internal power generator circuit according to claim 22, further comprising:
   a first detector circuit connected between the charge pump circuit and the second oscillator circuit for detecting a voltage of the charge pump to generate the first control signal based on the result of detection; and
   a second detector circuit connected between the charge pump circuit and the third oscillator circuit for detecting a voltage of the charge pump circuit to generate the second control signal based on the result of detection.

24. The internal power generator circuit according to claim 21, wherein the periodic circuit is operated in a shorter duration than a half-period or a complete period of the first control signal in response to the first pulse signal, and the periodic circuit is operated in a shorter duration than a half-period or a complete period of the second control signal in response to the second pulse signal.

* * * * *